United States Statutory Invention Registration [19]

[11] Reg. Number: H522

Poeppel et al. [43] Published: Sep. 6, 1988

[54] METHOD OF FORMING CERAMIC BRICKS

[75] Inventors: Roger B. Poeppel, Glen Ellyn, Ill.; Terry D. Claar, Newark, Del.; Peter Silkowski, Urbana, Ill.

[73] Assignee: The United States of America as represented by the United States Department of Energy, Washington, D.C.

[21] Appl. No.: 41,266

[22] Filed: Apr. 22, 1987

[51] Int. Cl.[4] ..... C05B 35/64
[52] U.S. Cl. ..... 264/63; 252/478
[58] Field of Search ..... 264/63; 252/478

[56] References Cited

U.S. PATENT DOCUMENTS

| | | | |
|---|---|---|---|
| 3,234,308 | 2/1966 | Herrmann | 264/63 |
| 3,352,656 | 11/1967 | McMillan | 65/33 |
| 3,361,684 | 1/1968 | Chvatal | 252/478 |
| 3,879,514 | 4/1975 | Dahl | 264/63 |
| 4,207,297 | 6/1980 | Brown | 423/179.5 |
| 4,265,845 | 5/1981 | Eschner | 264/63 |
| 4,369,154 | 1/1983 | Dougherty | 264/63 |

OTHER PUBLICATIONS

Dow Chemical Company, "Methocel", Product Information Sheet, May 1982.

*Primary Examiner*—John F. Terapane
*Assistant Examiner*—Eric Jorgensen
*Attorney, Agent, or Firm*—Hugh W. Glenn; Robert J. Fisher; Judson R. Hightower

[57] ABSTRACT

A method for forming free standing ceramic bricks for use as tritium breeder material is disclosed. Aqueous solutions of sodium carbonate and potassium carbonate are mixed with an organic hydrocolloid dispersion and powdered lithium carbonate, spray dried, and ceramic bricks formed by molding in a die and firing.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF FORMING CERAMIC BRICKS

CONTRACTUAL ORIGIN OF THE INVENTION

The U.S. Government has rights in this invention pursuant to Contract No. W-31-109-ENG-38 between the U.S. Department of Energy and the University of Chicago, the operator of Argonne National Laboratory.

BACKGROUND OF THE INVENTION

This invention relates to a process for the formation of ceramic bricks and more particularly for the formation of freestanding sintered bricks of lithium carbonate.

Lithium containing ceramics, such as $LiAlO_2$, are generally used as a tritium breeder material in a breeder blanket in nuclear fusion technology. Lithium nuclei are split by high energy neutrons yielding tritium, an isotope of hydrogen. A spatially uniform distribution of lithium isotopes reduces the complexity of many mathematical calculations concerning the dispersion of neutrons and the production of tritium. In addition, such ceramics can be used as neutron absorbing material where appropriate. Lithium carbonate is the most readily available lithium-containing ceramic. In the past, such lithium containing ceramics have been used in particle form or packed in various containers. The cost involved in the utilization of the ceramics in particle form is significant and in particle form the ceramic can have a fairly inefficient packing or density. It is essential that breeder materials be distributed as uniformly as possible, thereby requiring minimal variations in packing, if discrete particles are used, a factor which can vary significantly in individual applications. If bricks are used, the bricks may not exhibit any striations or other disruptive imperfections and variations in content. In addition, when forming the bricks, the green strength must be sufficient to permit handling of the green brick without a loss of integrity.

SUMMARY OF THE INVENTION

Accordingly, an object of the present invention is an improved method for forming a lithium carbonate freestanding ceramic brick for use as a tritium breeder material.

Another object of the subject invention is a method of cold pressing and sintering said ceramic brick, employing an organic binder material to maintain the unsintered brick in the desired shape until the brick is sintered.

A further object of the subject invention is the use of the sintering aids sodium carbonate and potassium carbonate in combination with the organic binder and lithium carbonate for the provision of a freestanding ceramic brick of high density.

In accordance with the above objects, the subject invention provides for a method of forming such a freestanding ceramic brick through the steps of preparing an aqueous solution of sodium carbonate and potassium carbonate, preparing an aqueous dispersion of a water dispersible organic hydrocolloid, and mixing both until a full solution is provided in the first and a uniform dispersion is provided in the second. The solution is mixed with the dispersion until a uniform consistency is achieved, at which point a fine lithium carbonate powder is added to form a smooth, consistent white slip. The water is removed from the combined mixture such as by spray drying and bricks formed from the resulting powder by pressing and sintering. The resulting green brick may be handled without a loss in integrity. The sintered bricks are shaped by sanding or filing to a desired geometric shape and are ready for use. No striation or other non-uniform distribution of its composition in the sintered brick is observed.

DETAILED DESCRIPTION OF THE INVENTION

In the production of the freestanding brick according to the subject invention, the water dispersible organic hydrocolloid for use as an organic binder of the green brick is preferably a blend of 85% microcrystalline cellulose and 15% sodium carboxymethylcellulose.

The hydrocolloid is used to bind the ceramic particles in the green, unsintered state, thereby holding the brick's shape until sintered, when the organic portion is essentially burned out. A preferred water dispersible hydrocolloid may be procured as FMC Avicel Type CL-611. The Avicel hydrocolloid binder is added to water to form a uniform dispersion. Sufficient hydrocolloid was added to form a 2–4% by weight of the total solution. An aqueous solution containing a mixture of alkali carbonates other than lithium carbonate, and preferably approximately 10% each of $Na_2CO_3$ and $K_2CO_3$, is prepared. The dispersion and solution are mixed, lithium carbonate is added with continuous stirring and the slip is then dried. In a preferred method of drying, the slip is run through a spray dryer such as a Buchi spray dryer, which is a small, laboratory-size spray dryer, which sucks up the solution and blows it out through a two fluid nozzle. The resulting spray is mixed with heated air adjusted to an outlet temperature of 100° C.±5° C., as known in the art. Other spray dryers are contemplated for use in the subject invention and may have a two fluid nozzle or a centrifugal nozzle; the solution may be sucked into the spray dryer or forced through by the application of pressure: further, the drying air may be heated by gas or electricity. The resulting powder should have a moisture content of approximately 0.5–2%.

The dried powder is then pressed into a desired shape at approximately 1,000–10,000 psi, and placed in an oven where it is fired, at temperatures increasing 50° C./hr. to a temperature between 385° C. and 450° C. where it is held for 4 hours.

A fine particle size of $Li_2CO_3$ may be used such as may be achieved by sieving the $Li_2CO_3$ through a 100 mesh screen. A fine powder such as this will provide a higher density in the sintered brick. It has been found that utilization of a coarse powder, i.e. that passing through a screen of approximately 60 mesh, will result in a higher density in the green or unsintered brick. However, the fine powder (100 mesh) $Li_2CO_3$ is preferred both for its facility in spray drying and the higher density in the fired brick.

The following examples relate to the subject method of forming freestanding ceramic bricks.

EXAMPLE

Solution 1

30 grams distilled water
3.5 grams $Na_2CO_3$
3.5 grams $K_2CO_3$

The above ingredients are mixed until full solution is obtained; mixing is continued.

Dispersion 2

70 grams distilled water
4.0 grams Avicel

The above materials are mixed. White globs are formed at first but after a few minutes, the globs go away and a smooth dispersion of eggwhite consistency is attained. Mixing is continued. The solution is added to the dispersion and mixing continued. 93.0 grams of $Li_2CO_3$ fine powder (100 mesh) is added to the combination and mixed until a smooth consistent white slip is obtained. The slip is then spray dried at 100° C. outlet temperature utilizing a Buchi spray dryer. The resulting spray dried powder has a moisture content of 1.5%. A green brick is pressed at 6,000 pounds (1,100 psi) using this spray dried powder in a die press. The resulting green brick satisfactorily holds its shape during handling and has a density equal to approximately 60% of theoretical. The green brick was sintered by heating the brick to 450° C. at the rate of 50° C. per hour, holding at 450° C. for four hours and then allowing the sintered brick to cool to room temperature. The resulting density of the sintered brick was 88%. The sintered brick was slightly warped, and no striations or other non-uniform distribution of its composition was observed. After being sanded to the necessary specified size and coated with a tritium barrier comprising an epoxy paint to make the resulting brick impermeable to water vapor and other gases, the sintered brick was ready for use as a tritium breeder material.

During the sintering phase, the binder is vaporized or oxydized; a eutectic mixture of the sintering aids, i.e. the sodium carbonate and potassium carbonate, with a small portion of lithium carbonate, are liquified, causing the lithium carbonate particles to consolidate. The resultant brick is lithium carbonate grains with a grain boundary phase of lithium carbonate with sodium carbonate and/or potassium carbonate.

As shown in the above example, a sintered lithium carbonate brick which may be formed in a specific reproducible size and shape. The brick may be handled in the green unsintered state, as a result of the green strength provided by the organic hydrocolloid binder material. As a result of the improved handling properties thereby imparted in the green state, the green brick may be more easily molded and sintered, while retaining a substantially uniform distribution of its composition for use as a tritium breeder material.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The embodiments of this invention in which an exclusive property or privilege is claimed are defined as follows:

1. A method of forming free-standing ceramic bricks comprising the steps of:

mixing an aqueous solution of a mixture of alkali carbonates selected from the group consisting of $K_2CO_3$ and $Na_2CO_3$ with an aqueous dispersion of an organic hydrocolloid to form a second aqueous mixture, blending in powdered lithium carbonate to form a slip, drying said slip to form a powder, molding said powder to form a green brick, and firing said green brick to form a sintered brick.

2. The method of claim 1 wherein said slip is dried to result in a powder having 0.5% to 2.0% moisture content.

3. The method of claim 1 wherein said powder is molded at 1000–10,000 psi.

4. The method of claim 1 wherein said green brick is fired by firing in an oven having the temperature raised at 50° C./hr. to a temperature between 385° C. and 450° C., where it is kept for 4 hours.

5. A method of forming free-standing ceramic bricks comprising the steps of:

mixing an aqueous solution of a mixture of alkali carbonates selected from the group consisting of $K_2CO_3$ and $Na_2CO_3$ with an aqueous dispersion of an organic hydrocolloid to form a aqueous mixture, blending powdered lithium carbonate into said mixture to form a slip, spray-drying said slip to form a powder of 0.5% to 2.0% moisture content, molding said powder to form a green brick, and firing said green brick in an oven by raising the temperature of the oven 50° C./hr. until a temperature between 385° C. to 450° C. is reached and holding for 4 hours to form a sintered brick.

6. The method of claim 5 wherein said organic hydrocolloid comprises a blend of microcrystalline cellulose and sodium carboxymethylcellulose.

7. The method of claim 7 wherein said blend comprises 85% microcrystalline cellulose and 15% sodium carboxymethylcellulose.

8. A method of forming free-standing ceramic bricks for use as neutron absorbing material comprising the steps of:

mixing an aqueous solution of a mixture of alkali carbonates selected from the group consisting of $K_2CO_3$ and $Na_2CO_3$ with an aqueous dispersion of a blend of 85% microcrystalline cellulose and 15% sodium carboxymethylcellulose to form an aqueous mixture, blending powdered lithium carbonate into said mixture to form a slip, spray-drying said slip to form a powder of 0.5% to 2.0% moisture content, molding said powder at 1,000 to 10,00 psi to form a free-standing green brick, and firing said green brick in an oven by raising the temperature of the oven 50° C./hr. until a temperature between 385° C. to 450° C. is reached and holding for 4 hours to form a sintered brick.

* * * * *